United States Patent
Ward et al.

(10) Patent No.: US 8,613,609 B2
(45) Date of Patent: Dec. 24, 2013

(54) BI-METAL PUMP GEAR

(75) Inventors: Lyle Ward, Rockford, IL (US); Steven A. Heitz, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 332 days.

(21) Appl. No.: 13/087,774

(22) Filed: Apr. 15, 2011

(65) Prior Publication Data

US 2012/0263618 A1  Oct. 18, 2012

(51) Int. Cl.
 *F04C 18/00* (2006.01)
 *F04C 2/00* (2006.01)
(52) U.S. Cl.
 USPC ............ 418/206.9; 418/1; 418/9; 418/182; 418/179; 464/158; 464/179
(58) Field of Classification Search
 USPC ............ 418/1, 102, 182, 178–179, 418/201.1–201.3, 205, 206.1, 206.9; 29/888.023; 464/157–158, 179, 902; 403/359.5, 359.1, 404
 See application file for complete search history.

(56) References Cited

U.S. PATENT DOCUMENTS

| | | | | |
|---|---|---|---|---|
| 2,100,251 | A | * | 11/1937 | Hobbs ........................ 475/255 |
| 4,595,349 | A | * | 6/1986 | Preston et al. ............. 418/206.1 |
| 5,112,259 | A | * | 5/1992 | McElroy et al. .............. 464/158 |
| 5,348,212 | A | * | 9/1994 | Galanes ....................... 228/135 |
| 6,189,313 | B1 | | 2/2001 | Cass et al. |
| 7,878,781 | B2 | | 2/2011 | Elder |
| 2002/0104393 | A1 | * | 8/2002 | Van Es et al. ..................... 74/87 |
| 2006/0272326 | A1 | * | 12/2006 | Ohashi et al. .................. 60/464 |
| 2010/0293919 | A1 | | 11/2010 | Poisson et al. |
| 2011/0002344 | A1 | | 1/2011 | Palin et al. |

* cited by examiner

*Primary Examiner* — Theresa Trieu
(74) *Attorney, Agent, or Firm* — Cantor Colburn LLP

(57) ABSTRACT

A pump gear is provided. The pump gear includes a first shaft portion having a first end and a second end with an integral gear portion formed therebetween. The first shaft portion is made from a first tool steel material. A second shaft portion having a third end brazed to the first end. The second shaft portion has at least one integral drive spline formed adjacent one end. The second shaft portion is made from a second tool material. The first tool steel material has a vanadium content by weight of greater than 9% and the second tool steel material has a vanadium content by weight of less than or equal to 1%.

20 Claims, 5 Drawing Sheets

BI-METAL PUMP GEAR

BACKGROUND OF THE INVENTION

The subject matter disclosed herein relates to a pump gear arrangement and in particular to a pump gear arrangement having a bi-metal shaft.

Pump gears are used in a variety of applications such as in fuel pumps for turbine engines. The pump gear typically includes a shaft having a spur gear and a drive spline formed on one end. To reduce cost and weight, pump gears are typically formed from a single unitary material. The pump gear is typically formed for example from a single piece of tool steel alloy bar stock. In general, the drive spline is a relatively small feature that is formed using conventional machining practices allowing it to be integrally and cost effectively formed on the pump gear shaft.

The pump gear may also provide additional functions such as provisions for mounting and driving centrifugal pumps, electrical generators, and auxiliary fuel or hydraulic pumps. These additional functions required a longer pump gear which incorporates drive splines, keys, and threads to retain these auxiliary components. These features are difficult to machine in the wear resistant materials needed for the pump gear. In addition, the cost of the pump gear material is typically over ten times the cost of the tools steels used for shafts, splines, and threaded joints. Reduced cost for raw materials and machining of splines and threads can be achieved joining wear resistant pump gear materials to conventional tool steel.

Due to the desire to form the drive spline as an integral feature, the machinability of material often drives the material selection. However, the desire for good machinability conflicts with a desired wear resistance property for the spur gear. In applications such as aircraft engines, the pump gear is operating in low lubricity jet fuel at high temperatures. This environment has been found increase the wear on the spur gear. While a higher wear resistance material could be used, this would increase the size, weight and cost of the pump gear since the drive spline may not be easily machined using these materials due to its small size. As a result, the desire for a light and small pump gear impacts operational life and increases maintenance costs.

Accordingly, while existing pump gears are suitable for their intended purposes the need for improvement remains, particularly in providing a pump gear having improved gear wear resistance while maintaining machinability of the drive spline and threaded features to retain additional components integrated with the pump gear.

BRIEF DESCRIPTION OF THE INVENTION

According to one aspect of the invention, a pump gear is provided. The pump gear includes a first shaft having a first end and a second end with an integral gear portion formed therebetween, the first shaft being made from a first tool steel material. A second shaft is arranged having a third end brazed to the first end, the second shaft having at least one integral drive spline, the second shaft being made from a second tool steel material. Wherein the first tool steel material has a vanadium content by weight of greater than 9% and the second tool steel material has a vanadium content by weight of less than or equal to 1%.

According to another aspect of the invention, another pump gear is provided. The pump gear includes a first shaft having a first end and a second end with an integral gear portion formed therebetween. The first shaft is made from a first steel alloy comprising by weight 2.45% carbon, 5.25% chromium, 81.25% iron, 1.30% molybdenum, and 9.75% vanadium. A second shaft is arranged having a third end brazed to the first end. The second shaft has at least one integral drive spline, the second shaft being made from a second steel alloy comprising by weight 0.40% carbon, 5.20% chromium, 91.15% iron, 1.30% molybdenum, 1.0% silicon, and 0.95% vanadium.

According to yet another aspect of the invention, A method of fabricating a pump gear is provided. The method includes forming a first shaft from a first steel alloy comprising by weight 2.45% carbon, 5.25% chromium, 81.25% iron, 1.30% molybdenum, and 9.75% vanadium. A gear is formed on the first shaft, the gear having teeth. A second shaft is formed from a second steel allow comprising by weight 0.40% carbon, 5.20% chromium, 91.15% iron, 1.30% molybdenum, 1.0% silicon, and 0.95% vanadium. A first end of the first shaft is coupled to a second end of the second shaft.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
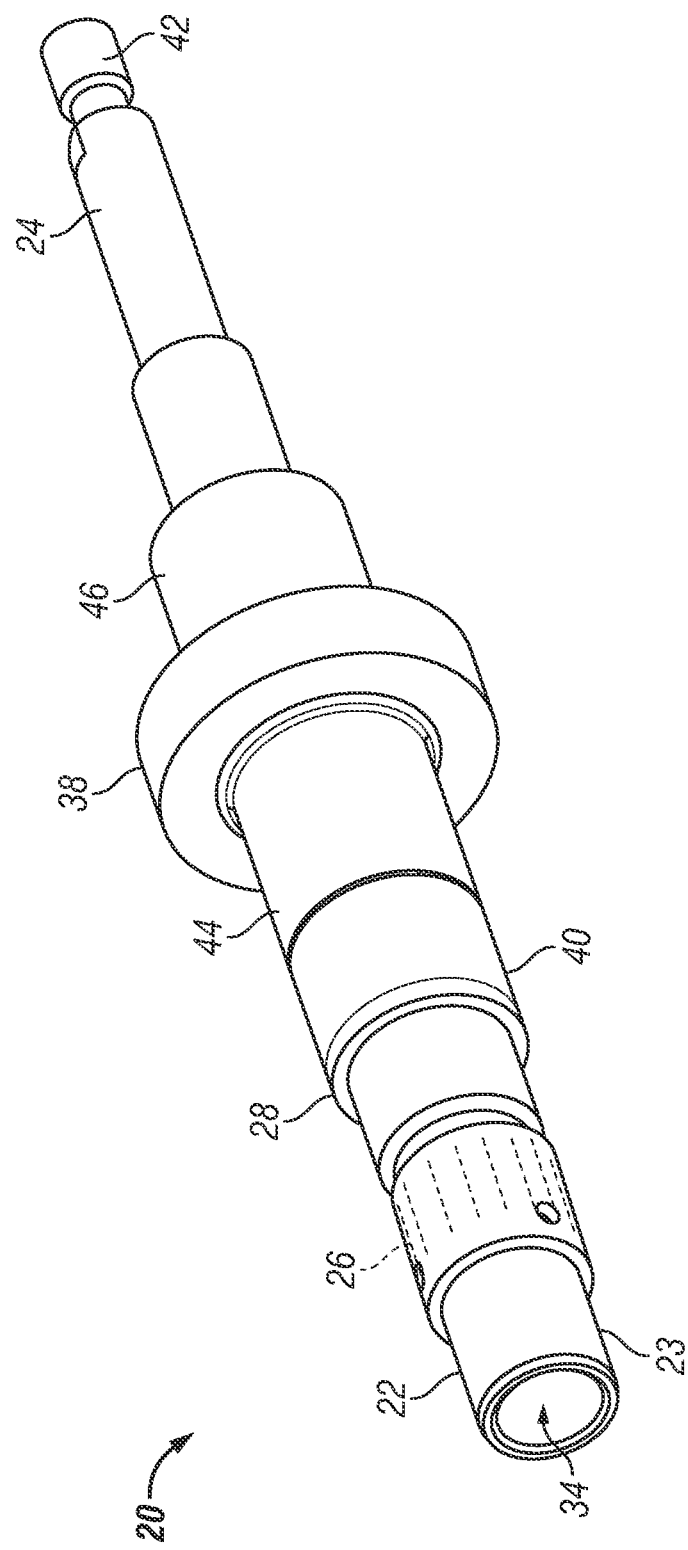
FIG. 1 is a perspective view of a pump gear according to an embodiment of the invention.
Figure 2:
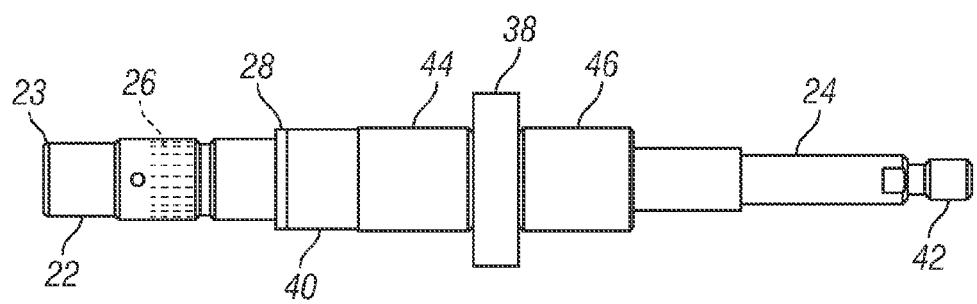
FIG. 2 is a side view of the pump gear of FIG. 1.
Figure 3:
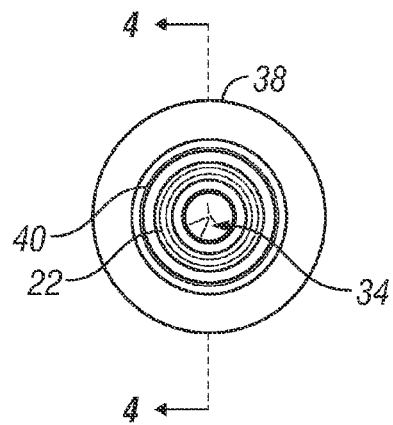
FIG. 3 is an end view of the pump gear of FIG. 1.
Figure 4:
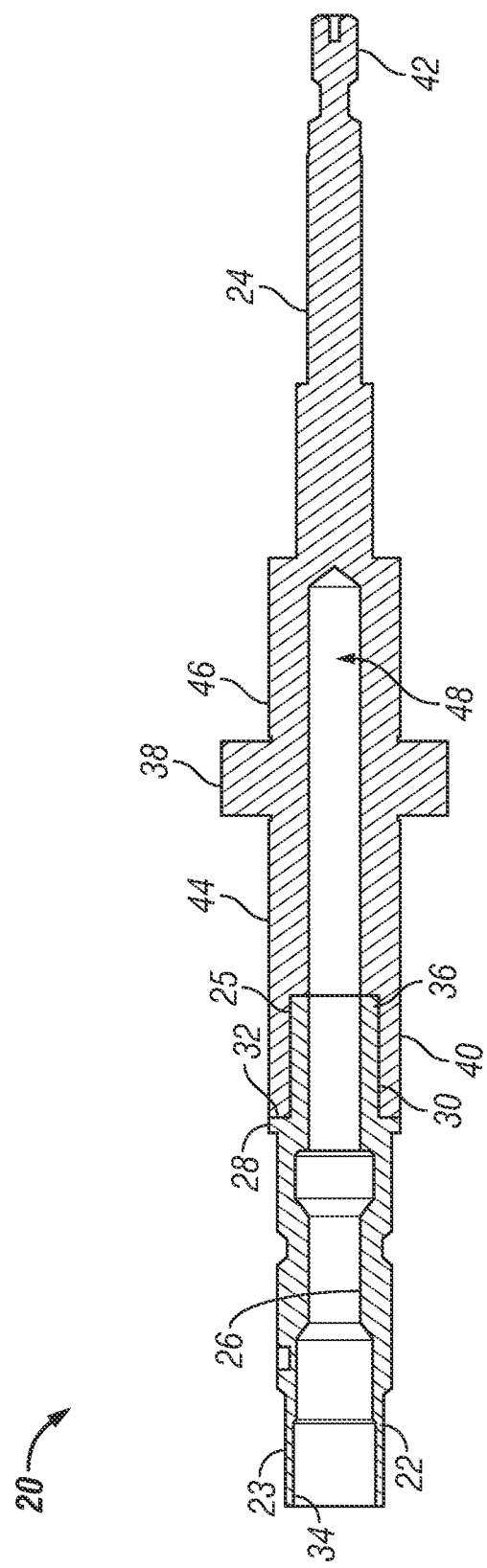
FIG. 4 is a sectional view of the pump gear of FIG. 1.

The detailed description explains embodiments of the invention, together with advantages and features, by way of example with reference to the drawings.

DETAILED DESCRIPTION OF THE INVENTION

Pump gear systems are often used in demanding operating environments involving weight, space and lubrication constraints. Embodiments of the present invention provide advantages improving operational life and reliability in a pump gear system. Embodiments of the invention provide further advantages in providing a pump gear that allows for machinability of features with decreased gear tooth wear in high temperature jet fuel applications.

An exemplary pump gear 20 is shown in FIGS. 1-4 having a first shaft portion 22 and a second shaft portion 24. In one embodiment, the pump gear 20 may be used in a fuel pump device such as that used in an aircraft engine for example. The first shaft portion 22 includes a first end 23 and a second end 25. Formed adjacent the first end is an integral internal drive spline 26. In the exemplary embodiment, conventional machining processes are used to form the drive spline 26 having a 13 tooth, 0.735-inch (9.525 millimeter) pitch diameter and a 30-degree pressure angle. The drive spline 26 adapts the pump gear 20 to mate with and transfer rotational energy from a power source (not shown).

The first shaft portion 22 further includes a cylindrical portion 28 having a larger diameter than adjoining cylindrical surface 30 to form a step surface 32. The step surface 32 forms a stop that the second shaft portion 24 rests against when the shaft portions 22, 24 are assembled. The first shaft portion 22 further includes a central bore 34 that extends therethrough.

In the exemplary embodiment, the first shaft portion 22 is made from a tool steel alloy that comprises by weight about 0.40% carbon, 5.20% chromium, 91.15% iron, 1.30% molybdenum, 1.0% silicon, and 0.95% vanadium. The tool steel alloy may be tool steel designated H13 by the American Iron and Steel Institute (AISI) or designated A681 by the American Society for Testing and Materials (ASTM). In one embodiment, the first shaft portion 22 may be made from Nu-Die® V (AISI H13) hot work tool steel manufactured by Crucible Industries. It has been found that low vanadium tool steels, such as less than 1% by weight vanadium for example, provides advantages in allowing the small drive spline 26 to be machined using conventional manufacturing processes.

The second shaft portion 24 includes a first end 40 and an opposing second end 42. The first end 40 includes a recess 36 sized to receive the cylindrical surface 30. The second shaft portion 24 further includes a spur gear 38 integrally formed on the second shaft portion 24. A first bearing journal 44 is arranged between the spur gear 38 and the first end 40. A second bearing journal 46 is arranged between the spur gear 38 and the second end 42. The second shaft portion 24 also includes a bore 48 that is coaxial with the central bore 34.

In the exemplary embodiment, the second shaft portion 24 is made from a tool steel alloy that comprises by weight about 2.45% carbon, 5.25% chromium, 81.25% iron, 1.30% molybdenum, and 9.75% vanadium. The tool steel alloy used to fabricate the second shaft portion may be may be designated AISI A11 or may be CPM® 10V tool steel manufactured by Crucible Industries. It has been found that that the AISI A11 tool steel having a high vanadium content, such as greater than 9% vanadium for example, provides advantages in higher wear resistance compared to AISI H13 tool steel when operating in low lubricity fuel at high temperatures.

To fabricate the pump gear 20, the first shaft portion 22 is machined from AISI H13 tool steel with the drive spline 26 formed integrally in the shaft. Similarly, the second shaft portion 24 is formed from AISI A11 tool steel with the spur gear 38 formed integrally in the shaft. The cylindrical surface 30 on the second end 25 is inserted into the recess 36 and the first shaft portion 22 is joined to the second shaft portion 24 by brazing to form a bi-metal shaft arrangement. Once the shaft portions 22, 24 are joined, the bores 34, 48 are formed coaxially with the centerline of the pump gear 20. In the exemplary embodiment, the cylindrical surface 30 has a diameter of 0.5770 inches (14.656 millimeters) +/−0.0005 inches (0.0127 millimeters) and the overlap between the first shaft portion 22 and the second shaft portion 24 is a ratio of 1.08 (+/−0.2) the diameter of the surface 30.

Figure 5:
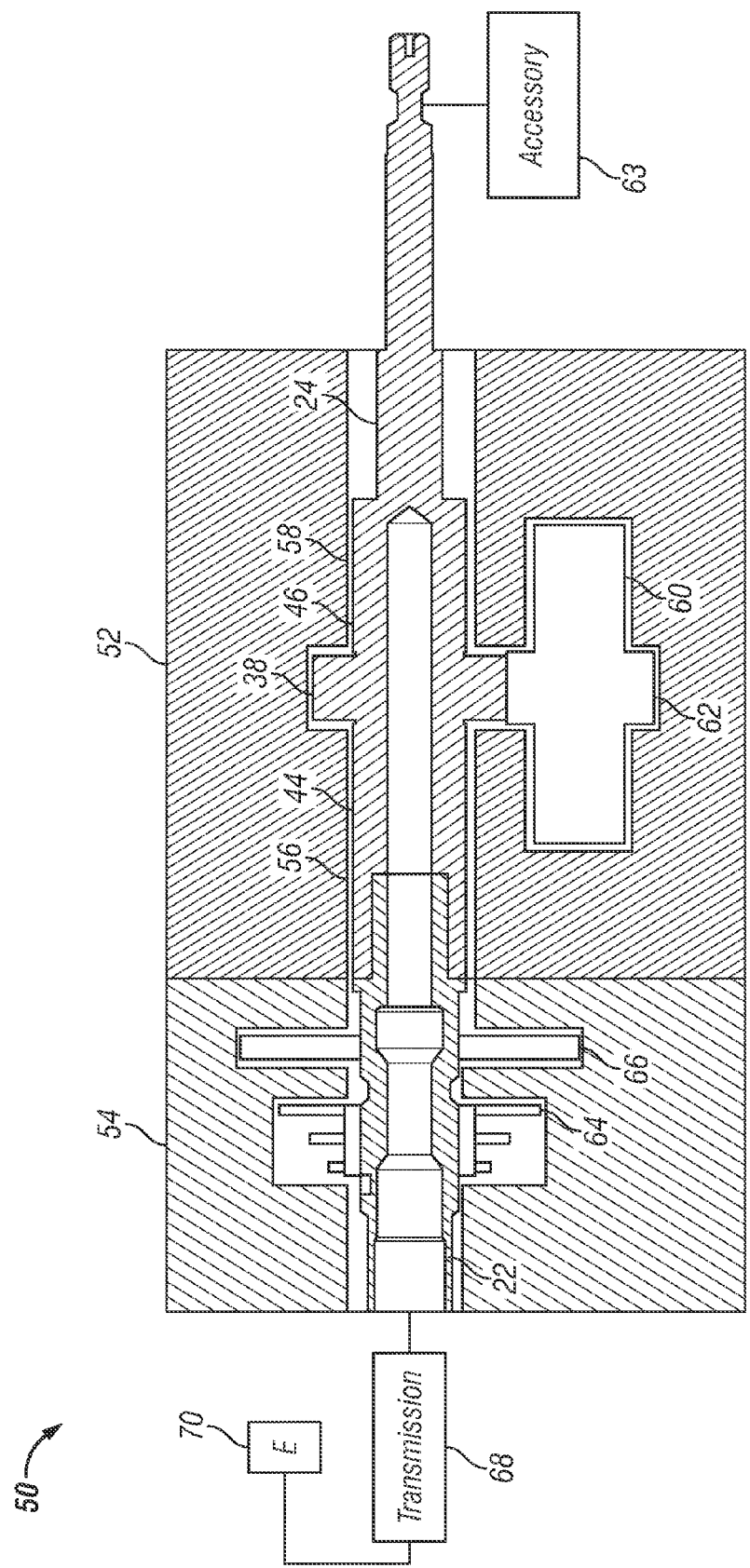
FIG. 5 is a sectional view of a pump having the pump gear of FIG. 1.

Referring now to FIG. 5, an embodiment of a pump 50 is shown. The pump 50 includes a first housing 52 and a second housing 54. The first housing 52 may include one or more journals 56, 58 that are sized to receive the journal bearings 44, 46 respectively. In the exemplary embodiment, the journals 56, 58 are sized to allow the pump gear 20 to float within the first housing 52. Arranged in parallel with the second shaft portion 24 is a second pump gear 60. The second pump gear 60 includes a gear portion 62 that cooperates with the spur gear 38 to increase the pressure of the fluid being moved. In one embodiment, the second end 42 extends beyond the second housing 52 to allow the pump gear 20 to be coupled to one or more accessory devices 63.

The first shaft portion 22 is arranged substantially within the second housing 54. Coupled to the first shaft portion 22 is a first stage pump section 64. In one embodiment, the pump section 64 is a helical impeller. Adjacent the first stage pump section 64 is a second stage pump section 66. In operation, the fluid being pumped is transferred through the first stage pump section 64 and second stage pump section 64 to the spur gear 38. The spur gear 38 cooperates with the gear portion 62 to increase the pressure of the fluid. Coupled to the first shaft portion 22 is a transmission system 68 that is coupled to an energy source 70 such as a motor for example. The transmission system 68 drives the pump gear 20 to operate the pump. It should be appreciated that the transmission system 68 may include gears, pulleys or belts to selectively operate the pump 50.

Figure 6:
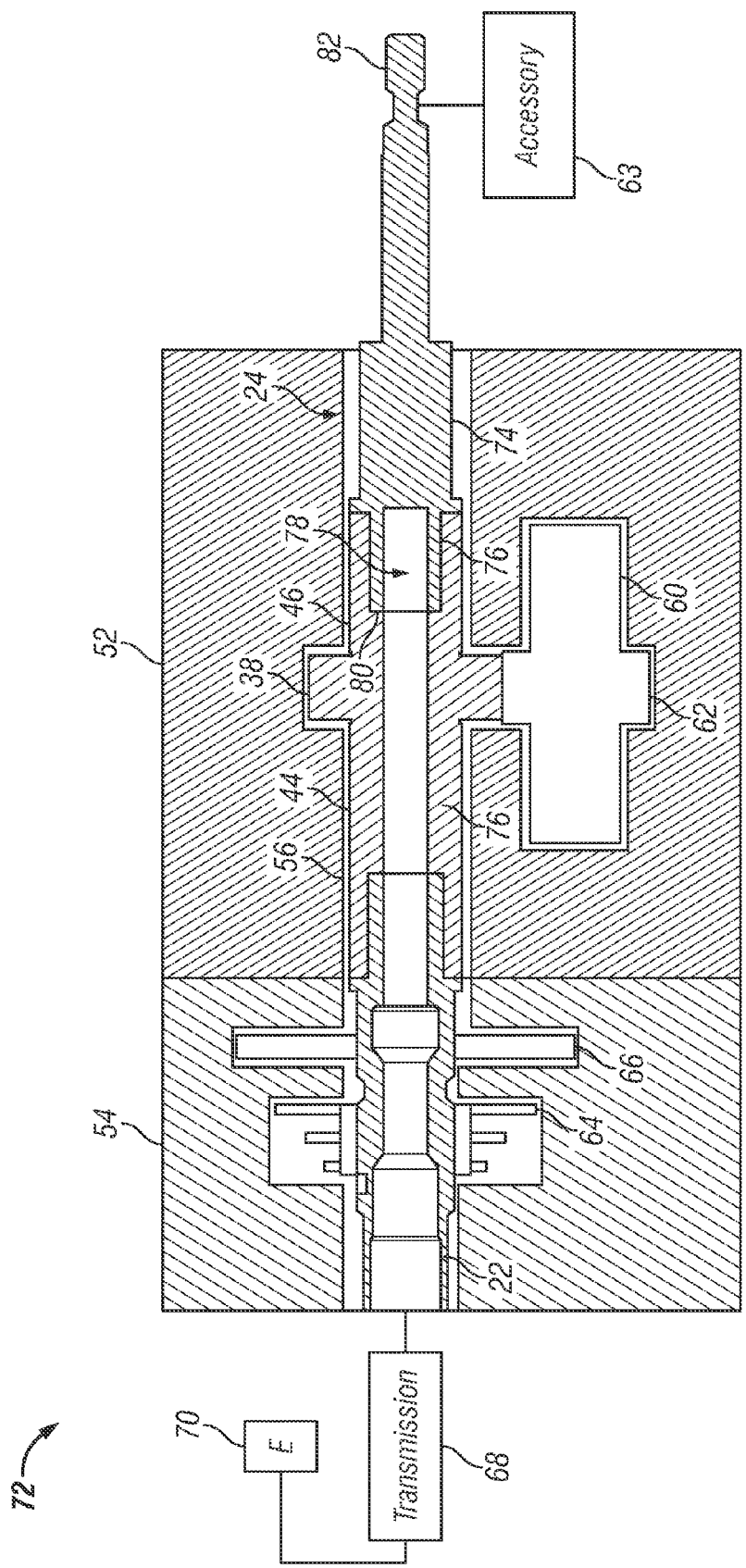
FIG. 6 is a sectional view of a pump having a third integral shaft.

Referring to FIG. 6, another embodiment of a pump 72 is shown. In this embodiment, the second portion 24 is formed from a gear shaft 76 and an end shaft 74. The end shaft 74 may be made from a tool steel alloy that comprises by weight about 0.40% carbon, 5.20% chromium, 91.15% iron, 1.30% molybdenum, 1.0% silicon, and 0.95% vanadium. The tool steel alloy may be tool steel designated H13 by the American Iron and Steel Institute (AISI) or designated A681 by the American Society for Testing and Materials (ASTM). In one embodiment, the end shaft 74 may be made from Nu-Die® V (AISI H13) hot work tool steel manufactured by Crucible Industries.

The end shaft 74 includes a first diameter 76 that is sized to be received within a recess in the gear shaft 76. A center bore 78 may be formed on the end 80. In the exemplary embodiment, the first diameter 76 has a diameter of 0.5770 inches (14.656 millimeters) +/−0.0005 inches (0.0127 millimeters) and the overlap between the gear shaft 76 and the end shaft 74 is a ratio of 1.08 (+/−0.2) the diameter of the diameter 76.

The end shaft 74 has a second end 82 that may be adapted to couple with one or more accessory devices 63. It should be appreciated that by forming the end shaft 74 from tool steel will further reduce the weight of the pump gearing system.

The gear shaft 76 is made from a tool steel alloy that comprises by weight about 2.45% carbon, 5.25% chromium, 81.25% iron, 1.30% molybdenum, and 9.75% vanadium. The tool steel alloy used to fabricate the gear shaft 76 may be may be designated AISI A11 or may be CPM® 10V tool steel manufactured by Crucible Industries. In the exemplary embodiment, the end shaft 74 is coupled to the gear shaft 76 by brazing.

It should be appreciated that the forming of a bi-metal pump gear provides advantages in allowing the small drive spline to be machined integrally with the shaft while providing a spur gear that as improved wear resistance when operating in low lubricity fuel at high temperatures. As a result, the pump gear fits within existing space envelopes and is lighter and less expensive when compared to a similarly performing pump gear fabricated from a single tool steel alloy.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pump gear comprising:
   a first shaft portion having a first end and a second end with an integral gear portion formed therebetween, the first shaft portion being made from a first tool steel material; and
   a second shaft portion having a third end brazed to the first end, the second shaft portion having at least one integral drive spline, the second shaft portion being made from a second tool steel material;
   wherein the first tool steel material has a vanadium content by weight of greater than 9% and the second tool steel material has a vanadium content by weight of less than or equal to 1%.

2. The pump gear of claim 1 wherein the first tool steel material has a vanadium content by weight of about 9.75% and the second tool steel material has a vanadium content by weight of about 0.95%.

3. The pump gear of claim 1 further comprising a third shaft portion coupled to an end of the first shaft portion opposite the second shaft portion, the third shaft portion being made from the first tool steel material.

4. The pump gear of claim 1 wherein the first tool steel material is an AISI A11 tool steel and the second tool steel material is an AISI H13 tool steel.

5. The pump gear of claim 4 wherein the first shaft portion includes a first bearing journal disposed between the gear portion and the first end and a second bearing journal disposed between the gear portion and the second end.

6. The pump gear of claim 5 wherein the first end includes a recess having a first diameter and the third end has a second diameter, wherein the first diameter is sized to receive the second diameter.

7. The pump gear of claim 6 wherein the first shaft portion and the second shaft portion are joined by brazing the third end to the recess.

8. A pump gear comprising:
   a first shaft portion having a first end and a second end with an integral gear portion formed therebetween, the first shaft portion being made from a first steel alloy comprising by weight about 2.45% carbon, 5.25% chromium, 81.25% iron, 1.30% molybdenum, and 9.75% vanadium;
   a second shaft portion having a third end brazed to the first end, the second shaft portion having at least one integral drive spline, the second shaft portion being made from a second steel alloy comprising by weight about 0.40% carbon, 5.20% chromium, 91.15% iron, 1.30% molybdenum, 1.0% silicon, and 0.95% vanadium.

9. The pump gear of claim 8 wherein the first steel alloy is an AISI A11 tool steel and the second steel alloy is an AISI H13 tool steel.

10. The pump gear of claim 9 wherein the first shaft portion includes a first bearing journal disposed between the gear portion and the first end and a second bearing journal disposed between the gear portion and the second end.

11. The pump gear of claim 10 wherein the first end includes a recess having a first diameter and the third end has a second diameter, wherein the first diameter is sized to receive the second diameter.

12. The pump gear of claim 8 further comprising a third shaft portion coupled to the first shaft portion opposite the second shaft portion, the third shaft portion being made from a second steel alloy comprising by weight about 0.40% carbon, 5.20% chromium, 91.15% iron, 1.30% molybdenum, 1.0% silicon, and 0.95% vanadium.

13. A method of fabricating a pump gear comprising:
   forming a first shaft portion from a first steel alloy comprising by weight about 2.45% carbon, 5.25% chromium, 81.25% iron, 1.30% molybdenum, and 9.75% vanadium;
   forming a gear on the first shaft portion, the gear having teeth;
   forming a second shaft portion from a second steel alloy comprising by weight 0.40% carbon, 5.20% chromium, 91.15% iron, 1.30% molybdenum, 1.0% silicon, and 0.95% vanadium; and
   coupling a first end of the first shaft portion to a second end of the second shaft portion.

14. The method of claim 13 further comprising:
   forming a recess having a first diameter in the first end; and,
   forming a second diameter of the second end.

15. The method of claim 14 wherein the coupling of the first end to the second end includes inserting the second diameter into the recess and brazing the second diameter to the recess.

16. The method of claim 15 further comprising:
   forming a first bearing journal adjacent the gear; and,
   forming a second bearing journal adjacent the gear opposite the first bearing journal.

17. The method of claim 16 further comprising forming a drive spline by machining on the second shaft portion.

18. The method of claim 13 further comprising:
   forming a third shaft portion from the second steel alloy; and,
   coupling the third shaft portion to the first shaft portion opposite the second shaft portion.

19. A method of assembling a pump comprising:
   installing a bi-metal pump gear within a pump housing, the bi-metal pump gear comprising:
      a first shaft portion formed from a first steel alloy comprising by weight about 2.45% carbon, 5.25% chromium, 81.25% iron, 1.30% molybdenum, and 9.75% vanadium;
      a first gear formed on the first shaft portion, the first gear having teeth;
      a second shaft portion formed from a second steel allow comprising by weight 0.40% carbon, 5.20% chromium, 91.15% iron, 1.30% molybdenum, 1.0% silicon, and 0.95% vanadium;
      wherein a first end of the first shaft portion is coupled to a second end of the second shaft portion;
   arranging the second shaft portion within the pump housing; and
   coupling the first gear to a second gear within the pump housing.

20. The method of claim 19 further comprising:
   coupling an energy source to a third end of the second shaft portion, the third end being opposite the second end; and
   coupling a transmission system between the energy source and the third end.

\* \* \* \* \*